Aug. 6, 1957 R. G. SWANSON 2,801,757
TRUCK HOIST
Filed March 22, 1954 4 Sheets-Sheet 1

INVENTOR.
ROLF G. SWANSON
BY
Paul, Moore&Lugger
ATTORNEYS

Aug. 6, 1957  R. G. SWANSON  2,801,757
TRUCK HOIST
Filed March 22, 1954  4 Sheets-Sheet 2

INVENTOR.
ROLF G. SWANSON
BY
ATTORNEYS

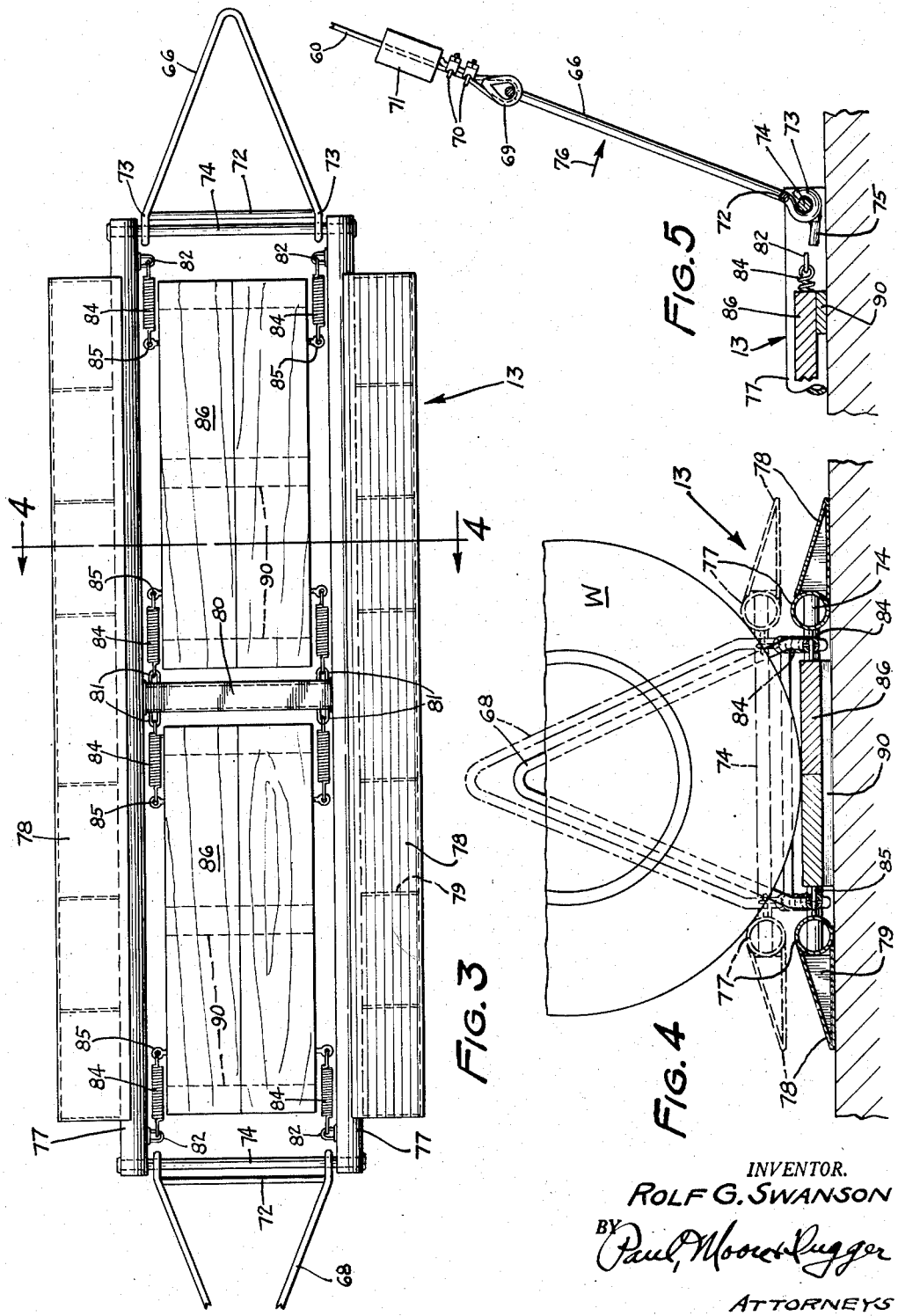

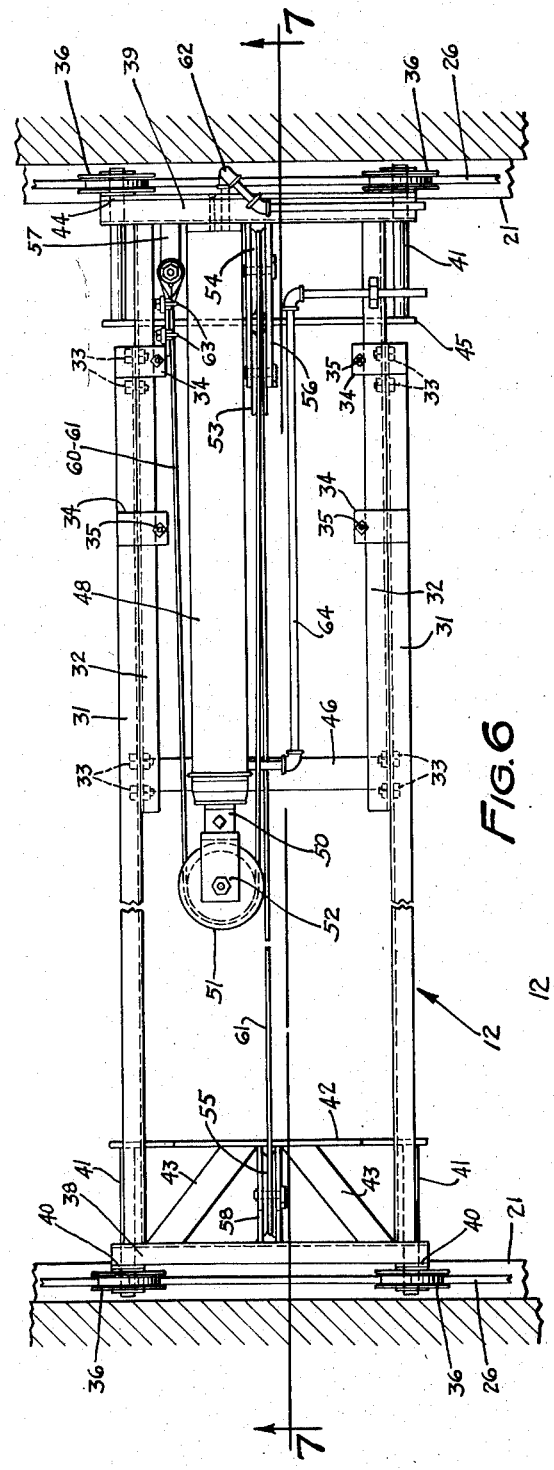
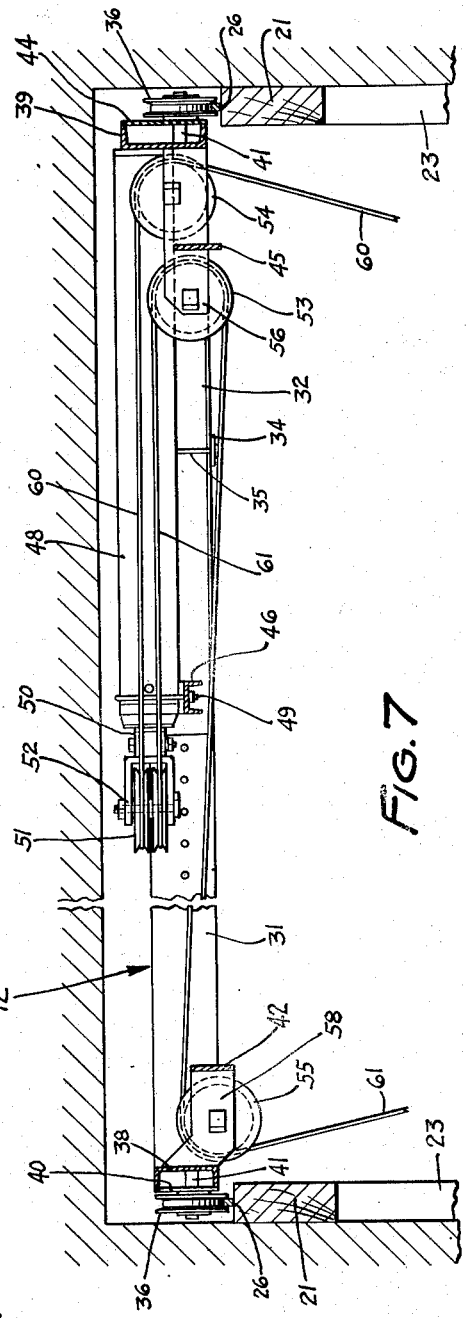
FIG. 6
FIG. 7
INVENTOR.
ROLF G. SWANSON
BY
ATTORNEYS

United States Patent Office 2,801,757
Patented Aug. 6, 1957

2,801,757

TRUCK HOIST

Rolf G. Swanson, Minneapolis, Minn., assignor to The Strong-Scott Manufacturing Company, Minneapolis, Minn., a corporation of Minnesota Application March 22, 1954, Serial No. 417,843

4 Claims. (Cl. 214—46.34)

This invention relates to new and useful improvements in truck hoists of the type sometimes referred to as "truck dumps." These hoists are of the overhead suspension type and include an overhead framework supporting a cradle upon which the front wheels of a truck or other vehicle are to be positioned. The hoist operates to elevate the front end of a truck, pivoting the truck about its rear axle as an axis, and thus serves to dump a load of material contained in the truck body through a grate positioned adjacent the rear wheels of the truck. These hoists are most commonly used in grain elevators for elevating the front end of a truck to dump a load of grain from the truck box and through a dump grate positioned immediately behind the rear wheels.

While truck hoists or dumps of various kinds have heretofore been utilized, none of them have been wholly satisfactory for several reasons. They have required more overhead height than the ordinary elevator is able to provide, they have had no provision for a safety mechanism for preventing overload of the hoists, they have provided insufficient lifting advantage, have not provided a variable speed elevation or descent and have always been subject to "creeping" or "jerking."

It is therefore an object of this invention to obviate the defects heretofore found in previous truck hoists.

It is a further object of this invention to provide a versatile and readily adjustable truck hoist which may be utilized in a smaller space than has heretofore been possible and to provide a truck hoist requiring minimum overhead height.

It is a further object of this invention to provide a truck hoist of easy and rapid operation, of variable speed and providing powered descent for the hoist.

It is still a further object of this invention to provide a safe, hydraulically operated truck hoist which will not "creep" or "jerk."

Another object of this invention is the provision of a hydraulic truck hoist having lower maintenance cost, and which will elevate the front end of a truck safely, efficiently and quickly.

A further object of this invention is the provision of a truck hoist having a transversely movable carriage and a longitudinally positioned hydraulic means operative together with mechanical multiplication means for hoisting the front end of a motor vehicle.

Another object of this invention resides in the provision of new and useful cradle supporting structure for the front wheels of a motor vehicle.

Still another object of this invention resides in the utilization of a remotely positioned hydraulic power unit in cooperation with a truck hoist carriage and cradle support thereon.

Other and further objects of the invention reside in the specific constructional features of the cradle, cradle supports, movable carriage and hydraulic power unit in cooperation therewith.

To the accomplishment of the foregoing and related ends, this invention then comprises the features hereinafter fully described and particularly pointed out in the claims, the following description setting forth in detail certain illustrative embodiments in the invention, these being indicative, however, of but a few of the various ways in which the principles of the invention may be employed.

This invention will be described with reference to the drawings in which corresponding numerals refer to the same parts and in which:

Figure 3 is an enlarged top plan view of the cradle of my invention;

Figure 4 is an enlarged sectional end elevation of the cradle on the line 4—4 of Figure 3;

Figure 5 is a fragmentary side elevation of the cradle of Figure 3;

Figure 6 is an enlarged top plan view of the carriage of my invention;

Figure 7 is a sectional elevational view of the carriage on the line 7—7 of Figure 6.

Figure 1:
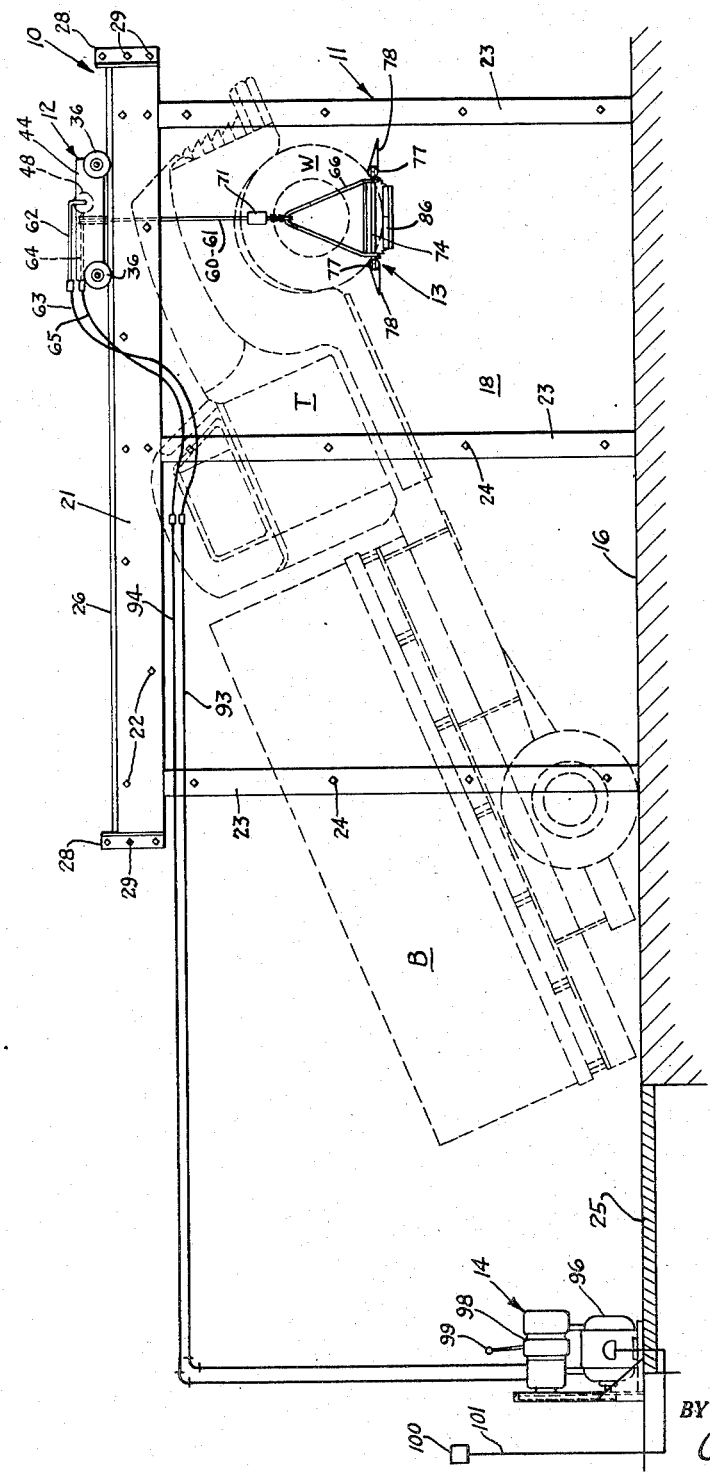
Figure 1 is an elevational view of my invention in position in a grain elevator and hoisting a truck to elevated or dumping position.

Referring now to the drawings, my truck hoist generally designated 10 comprises four major elements: a supporting structure generally designated 11, a carriage generally designated 12, a cradle generally designated 13 and a hydraulic power unit generally designated 14.

My truck hoist 10 is generally utilized in an enclosure in a grain elevator, generally designated 15, provided with a floor or supporting surface 16, walls 18 and 19 and ceiling 20. My supporting frame usually comprises a pair of track timbers 21 each of which is mounted upon one of walls 18 and 19 by suitable bolts 22 appropriately spaced. While in actual practice timbers are usually used and are usually secured to the walls by bolts, it is to be understood that other supporting members may be used, secured to the walls by other convenient and conventional means. Moreover, it is contemplated that under some circumstances, the members 21 may not be secured to the walls but may be fully supported by uprights.

Upright supports 23 are usually made of timber and are secured to the walls 18 and 19 by suitable bolts 24. It is conventional to provide three upright supports 23 for each one of the track timbers 21. Thus, the uprights 23 and track members 21 provide a supporting frame which, while usually connected to the walls of the grain elevator, may be constructed so as to provide a complete and rigid supporting frame, if desired.

The timbers 23 extend from the members 21 to the floor 16 of the grain elevator. A portion of the floor 16 is apertured or reticulated at 25 to provide a dump grate through which grain may be ejected from the box B of the motor vehicle or truck T, when it is elevated to the position of Figure 1.

On the top of each one of the members 21 is a track 26 which is fastened thereto by screws or other suitable means not shown. Positioned at each end of one of the members 21 is an angle stop 28 secured to the wall of the grain elevator by bolts 29. Angle stops 28, one on each end of members 21, extend upwardly a short distance beyond the height of members 21 and serve to limit the travel of carirage 12 upon rail 26. In addition, they serve to provide additional support for members 21 and prevent these members from shifting longitudinally.

The carriage 12 is shown best with reference to Figures 6 and 7. This carriage is shown comprising two pairs of channel members 31 and 32, members 31 and 32 being placed back-to-back in each pair as seen best with reference to Figure 6. Members 31 and 32 are adjustably secured together by a plurality of bolts 33 positioned in cooperating apertures in members 31 and 32 and by a plurality of clamp bars 34. Clamp bars 34 are positioned in cooperating pairs, two on the top flange of members 31, and two disposed directly therebelow. The clamp bars 34 extend inwardly beyond the width of member 32 and are secured together at their inner ends by bolts 35.

Thus, it will be seen that bolts 35 may be loosened, bolts 33 removed and the members 31 and 32 moved longitudinally inwardly and outwardly to provide longitudinal adjustment for the total length of the carriage 12. When the desired adjustment is reached so that the wheels 36 are positioned upon tracks 26, the bolts 35 are tightened to clamp members 32 between cooperating pairs of bars 34, bolts 33 are inserted in cooperating apertures through members 31 and 32 and tightened to provide two rigid supporting frame members 31—32.

Thus, it will be seen that adjustment of the length of the carriage 12 is permitted by the utilization of clamp bars 34 and the utilization of the bolts 33 and cooperating spaced apertures.

Secured to the exterior ends of members 31 by welding or other suitable means is a channel member 38 and likewise secured to the exterior end of members 32 is a channel member 39. Members 38 and 39 have their flanges turned outwardly with reference to the carriage as shown in Figures 6 and 7. At each end of member 38 is provided a plate 40 which serves to join the two flanges thereof. Each plate 40 is apertured to receive an axle 41 upon the end of which a wheel 36 is journalled. The axle 41 is supported by the plate 40 and by a second plate 42 inwardly spaced therefrom and connected to the frame members 31. Member 42 is also connected to member 38 by a pair of diagonal braces 43. Channel member 39 is likewise provided with a single plate member 44 which extends the full length of channel 39 and is apertured to receive axles 41 which are secured to the inwardly spaced supporting brace 45, similar to brace 42. Wheels 36 are journalled to these axles also.

Thus, it will be seen that two wheels 36 are supported on axles 41 on frame members 38 and 42, and two wheels 36 are supported by axles 41 on members 39 and 45. Hence, there are provided four wheels for the carriage 12 upon which it is free to move upon the tracks 26 (upwardly and downwardly with reference to Figure 6). A supporting brace 46 anchors the interior ends of members 32 to one another.

A hydraulic cylinder 48 is anchored at its base end to member 39 and is supported upon members 45 and 46, resting thereon, being secured to supporting member 46 by a U-bolt 49 as shown best in Figure 7. This cylinder is provided with a piston 50 to the end of which is secured a dual sheave 51 rotatable in bearing 52. Three additional sheaves 53, 54 and 55 are positioned upon the carriage 30. Each one of these sheaves 53—55 are single sheaves. Thus, sheave 53 is supported by a bracket 56 comprising a pair of spaced members which are in turn supported by members 45 and 39. Sheave 53 is supported for pivotal rotation therein.

Sheave 54 is supported by the same bracket but spaced rightwardly with reference to Figure 7 from sheave 53.

Sheave 55 is supported from bracket 58 comprising a pair of spaced members of the configuration shown in Figure 7 secured at their ends to members 38 and 42.

Dual cables 60 and 61 are each attached to an anchor lug 57 and are in turn attached to member 39 by cable clip 63 as shown for cable 60. Each one of the cables 60 and 61 passes over the double sheave 51 and from thence cable 60 passes downwardly over sheave 54 and cable 61 passes around sheave 53 and downwardly over sheave 55 as shown in Figure 7.

A first stiff hydraulic conduit 62 is connected to the base end of cylinder 48 and to flexible conduit 63. A second stiff hydraulic conduit 64 is attached to the piston end of cylinder 48 and to flexible conduit 65 as shown in Figure 1.

Reference is now made specifically to Figures 3–5. In these figures is shown the cradle 13 which is supported from cables 60 and 61. The end of cable 60 is attached to hanger or bail 66 and the end of cable 61 is attached to hanger or bail 68. Since the attachment of the ends of the cable to the hangers 66 and 68 is identical, the attachment will be explained only with reference to cable 60 and bail 66. Thus, the end of cable 60 is passed around a thimble 69 which is looped around the bar stock of bail 66. The extreme end of the cable 60 is then attached to an intermediate portion by cable clips 70 as shown in Figure 5. As shown in Figure 5, the cable 60 may first be passed through the elongated aperture of a weight 71 before being secured to the bail or hanger 66. However, other means may be provided for securing the weight 71 to the cable 60, such as a slotted weight, a clamp, etc. In normal useage, a weight is provided for both cables 60 and 61.

The hangers 66 and 68 as will be seen best with reference to Figures 3 and 4, comprise an A-frame having a reinforcing cross bar 72 adjacent the base thereof. The ends 73 of the hangers are turned to provide eyes through which is received shaft 74. Each one of the eyes for ends 73 may be provided with an extending finger 75 fastened thereto so that when the cradle 13 is lowered into engagement with the supporting surface, the surface will engage the finger 75 to impel the hanger 66 in the direction of the arrow 76 of Figure 5. Thus, the cooperation of fingers 75 and ring weight 71 insures that as the cradle engages the surface the finger 75 will bias the hanger 66 to the position of Figure 5 from whence the ring weight will draw it outwardly. Consequently, the hangers fall flat on the surface when the cradle is lowering and cables 60 and 61 are slackened and this eliminates the danger of a truck snagging them as driven onto or off of the cradle.

The cradle comprises a pair of longitudinally extending tubular supports 77 secured in spaced relation to shafts 74 at the ends thereof. Each one of the supports 77 is provided with a V-ramp 78 welded or otherwise secured thereto and provided with a plurality of internal gores 79 to provide strength. The ramps 78 are inclined to provide means by which the front wheels of the truck may be driven onto or off of the cradle 13.

Supports 77 are also joined by a center reinforcing member 80. A pair of U-bolts 81 are secured to either side of the member 80. A second pair of U-bolts 82 is secured to each of members 77 adjacent their ends. Secured to each one of the U-bolts 81 or 82 is a spring 84 the other end of which is secured to an eye 85 attached to a double plank 86. Thus, there are provided two planks 86, one end of which is secured and supported from the members 77 by two springs 84 secured to U-bolts 82 and the other end of which is secured and supported from members 77 by springs 84 secured to U-bolts 81.

Each one of the supporting planks is provided with transverse ground engaging members 90, three in number which are of such thickness as to provide a surface for planks 86 which will lie substantially in the plane of the top of the members 77 when the cradle is in the position of Figure 4.

Thus, it will be seen that when the cradle is in ground engaging or full line position of Figure 4, the supporting planks 86 together with the top of members 77 provide a substantially planar supporting surface upon which the wheels W of the truck are positioned. As the cradle is elevated to the dotted line position of Figure 4 to commence to lift the wheels W of the truck, the springs 84 extend and the planks 86 remain in the full line position of Figure 4 until the ramps 78 and members 77 have attained the dotted line position of Figure 4 whereupon the ramps 78 and members 77 and planks 86 will remain in constant relation throughout further elevation of the cradle 13.

With reference now to Figure 1, it is shown that the flexible conduits 63 and 65 are joined to stiff conduits 93 and 94 respectively. Conduits 93 and 94 are positioned upon either one of the walls 18 or 19 of the grain elevator and secured thereto by any suitable means. The conduits extend a considerable distance in a horizontal direction along this wall and then descend in a vertical direction to connections with hydraulic power unit 14 which comprises an electric motor 96 connected to a pump and reservoir 98 having a control lever 99 thereon connected to a valve 102. The electric motor 96 is connected to a switch box 100 by lead lines 101 from thence it is connected to any suitable source of electric power.

The pump and reservoir unit 98 is shown in Figure 1. The pump and its control valve 102 are shown schematically in Figure 8, but for the sake of clarity the reservoir shell has been omitted. Thus, in Figure 8, there is shown an oil filter 103 comprising a fine mesh screen which is connected to the pump intake ports 104 and 105 and through which all of the oil circulating through the pump is constantly refiltered.

Figure 8:
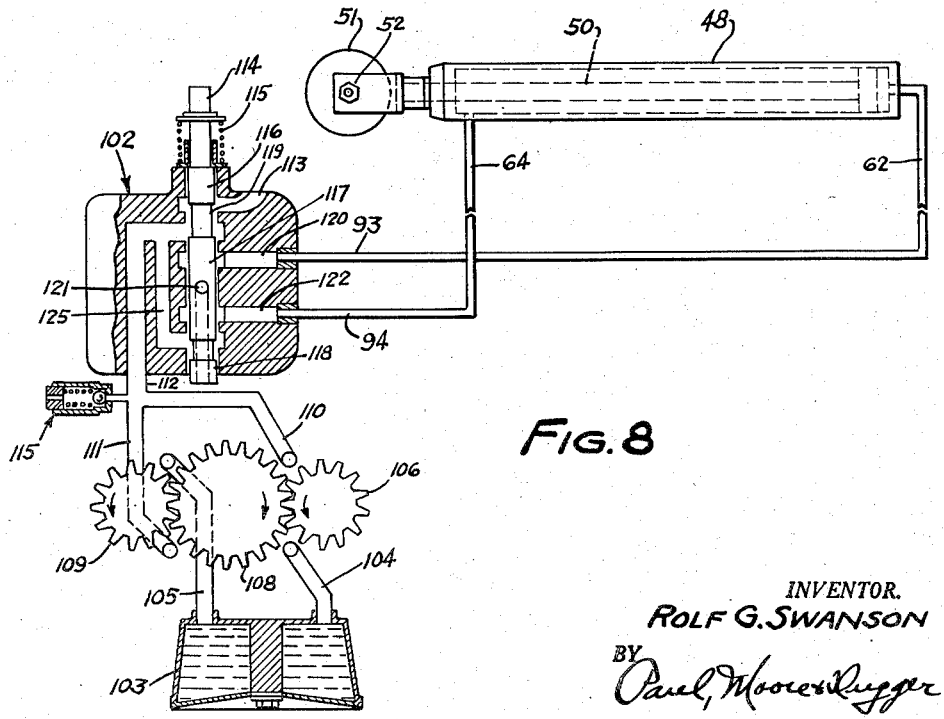
Figure 8 is a schematic view of the hydraulic control system of my invention.

Intake port 104 is positioned adjacent the pump gears 106 and 108, pump gear 108 being the driving gear connected to the shaft of motor 96. Intake port 105 is positioned at the juncture of pump gears 108 and 109 as shown in Figure 8. Thus, as gear 108 rotates in the direction of the arrow of Figure 8, it will rotate gears 106 and 109 in the direction of the arrows and fluid will be drawn through the filter 103 and ports 104 and 105 and pumped through outlet ports 110 and 111 which connect to passageway 112. Passageway 112 provides a passageway through valve 102 which normally connects with passageway 113 as shown in Figure 8. Passageway 113 leads from valve 102 back into the reservoir. Thus, when the motor 98 is turning and the spool 114 of valve 102 is in normal position, fluid is pumped through filter 103, ports 104 and 105, and 110 and 111 through passageway 112 and thence through passageway 113 back to the reservoir.

A pressure relief valve 115 is provided connected to passageway 112 which comprises a spring loaded ball check valve in a cartridge which is pre-set to open at the limiting pressure of the pump operating range.

Spool 114 for valve 102 is provided with a coil spring 115 which serves to retain it in normal position. It is provided with enlarged portions 116, 117 and 118. When the spool 114 is depressed or moved downwardly with reference to Figure 8, reduced portions 119 cooperates with the annular space at the end of passageway 120 and oil is permitted to flow through passageway 112 and passageway 120 into conduit 93 to extend the piston 50. The spool 114 is provided with a port 121 which, when spool 114 is depressed, will register with passageway 122 for conduit 94 and oil will return from cylinder 48 through conduit 94 passageway 122 and thence through port 121 to the reservoir. At this time the passageway 113 is blocked off by the enlarged portion 116.

When the spool 114 is elevated, the enlarged portion 117 serves to block off passageways 113 and 112 and oil is transmitted via passageway 125 through the enlarged space at the end of passageway 122 and thence through passageway 122 to conduit 94. This serves to retract the piston 50 under pressure in cylinder 48. During such retraction, conduit 93, through its connections to cylinder 48, serves as a return conduit and oil is permitted to flow through passageway 120 and port 121 which is at this time in registry with this passageway.

Thus, it will be seen that there is provided control means whereby the piston 50 may be extended or retracted under pressure and whereby if a load exceeding the safe limit is placed upon piston 50, the relief valve 115 will operate and such load cannot be moved.

By reference to Figure 1, it may be seen that the hydraulic power unit 14 may be positioned a considerable distance away from the carriage 12. It will also be seen that the use of tracks 26 and flexible conduits 63 and 65 allows the position of the carriage 12 with reference to the dump gate 25 to vary considerably. Thus, the apparatus can be used with trucks of radically different length wheel base.

In operation, the truck T will be driven into position underneath the track timbers 21 and over one of the ramps 78 onto the cradle 13. The carriage 12 will have been previously positioned with reference to the wheel base of the truck so that when the front wheels are in position on the cradle 13 the rear wheels will be approximately in the position shown in Figure 1 so that as the truck is elevated to the dotted line position of Figure 1, grain will be dumped from the body B of the truck through the gate 25. As the wheels W of the truck ride over ramp 78, they will engage the supporting plank members 86 which are maintained in elevated position by the engagement of supports 90 with the floor surface 16 of the elevator.

Figure 2:
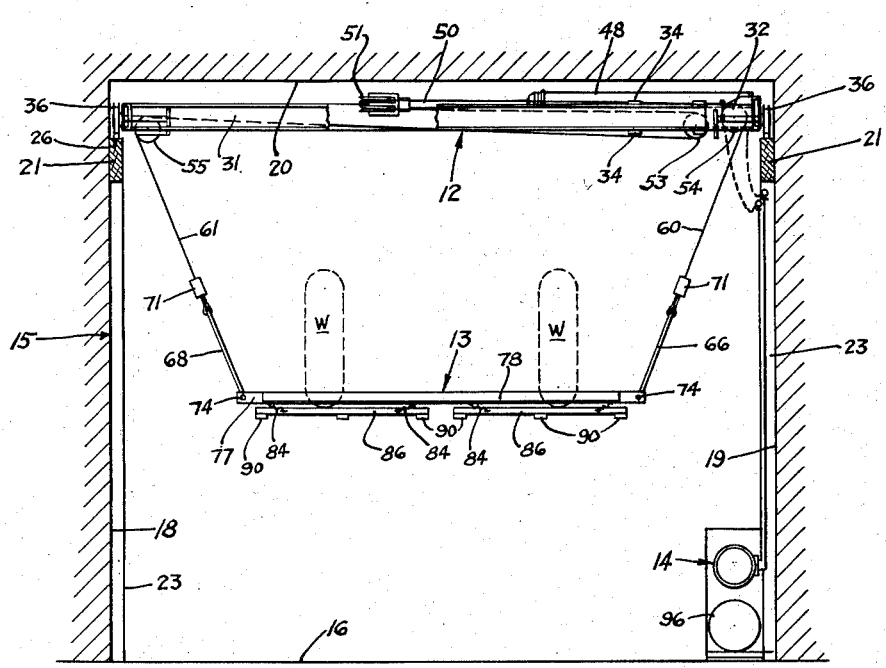
Figure 2 is a front elevational view of my invention showing a truck in the elevated position of Figure 1.

At this time, the bails or hangers 66 are outwardly biased by the cooperation of finger 75 and weights 71 and are usually in flat-wise engagement with the supporting surface 16 since cables 60 and 61 are slackened. The lever 99 is manipulated to depress spool 114 of valve 102 to supply fluid to conduit 62, forcing the position 50 leftwardly with reference to Figures 6–8, whereupon the cables 60 and 61 will be drawn taut by the movement of the double sheave 51 due to the extension of piston 50 and the cradle 13 will be drawn from the full to the dotted line position of Figure 4 and thence to the position of Figure 1. As the ramps 78 and supporting members 77 are drawn from the full to the dotted line position of Figure 4, the supports 86 will remain in the full line position of Figure 4 until the ramps 78 and members 77 reach such dotted line position. The supporting members 86 and members 77 and ramps 78 will then be elevated in constant relationship as shown in Figure 1. After the grain has been dumped, and when it is desired to return the truck to the normal position with all four wheels engaging the ground, lever 99 is manipulated to elevate spool 114 of valve 102 to supply fluid to conduit 64, forcing the piston 50 to retract or move rightwardly with reference to Figures 6–8. The weight of the truck together with the pressure retraction of piston 50 will carry the cradle from the position of Figures 1 and 2 to floor engaging position but always under the control of the operator.

It will be seen by particular reference to Figures 6 and 7 that when the piston 50 is extended, the double sheave 51 will be moved forwardly or leftwardly with reference to Figures 6 and 7 and since the ends of cables 60 and 61 are fixedly connected to anchor 62, the cables will be pulled around sheaves 54 and 53 and 55 respectively as the piston moves leftwardly and therefor the cables 60 and 61 will elevate the cradle 13 upwardly from the supporting surface 16.

Since the ends of cables 60 and 61 are fixed and are passed around the movable double sheave 51, it will be seen that the sheave 51 will move leftwardly half the distance that the cradle 13 moves upwardly, thus providing an elevation of the cradle two feet for every one foot that the sheave 51 moves leftwardly. Thus, the cradle 13 will travel upwardly twice as fast as the piston 50 moves leftwardly providing rapid ascent of the cradle and providing the utilization of a relatively short piston 50 for relatively long length of travel of cradle 13.

I have also found it extremely advantageous to provide a safety relief valve for my hydraulic power unit so that the cradle 13 cannot be overloaded and when too severe a load is placed thereon the relief valve will be operated and the truck cannot be elevated.

As many widely differing embodiments of this invention may be made without departing from the spirit and scope thereof, it is to be understood that I do not specifically limit myself to the embodiments disclosed herein.

What I claim is:

1. In combination, a cradle means upon which the leading wheels of a vehicle are adapted to be supported, cable means suspending said cradle means from overhead supporting means, frame means supporting said overhead supporting means including hydraulic means positioned for cooperative engagement with said cable means for elevating said cradle means, said cradle means comprising a pair of spaced supporting members, a pair of depressible planar members positioned interior of said spaced members and secured thereto by extensible spring means.

2. In combination, a cradle means upon which the leading wheels of a vehicle are adapted to be supported, flexible means suspending said cradle means from a wheeled horizontally movable overhead trolley, said trolley being supported upon a pair of parallel rails each positioned upon a longitudinal supporting member, each of said longitudinal supporting members in turn being supported by spaced vertical members engaging the floor supporting surface of the building in which said structure is to be positioned, hydraulic means carried by and movable with said trolley for cooperative engagement with said flexible means for elevating said cradle means, said cradle means comprising a pair of spaced rigid supporting members fixedly attached to said flexible means, a V-shaped ramp secured to at least one of said supporting members and having strengthening means provided therefor, a pair of members positioned interior of said rigid fixed spaced members depressible with reference thereto and adapted to be depressed by the wheels of a motor vehicle as said cradle is elevated.

3. In combination, a cradle means upon which the leading wheels of a vehicle are adapted to be supported, flexible means suspending said cradle means from an overhead supporting means, frame means supporting said overhead supporting means, and hydraulic means carried by said overhead supporting means for cooperative engagement with said flexible means for elevating said cradle means, said flexible means comprising a pair of cables each suspended from adjacent one end of said overhead supporting means, said cradle means having an extension substantially less than the distance between said cables, one end of each of said cables attached to a bail pivotally connected to an end of said cradle means, and each of said bails having a ground engaging extension for biasing said bails outwardly as said cradle means engages the supporting surface with which said hoist is adapted to be used.

4. In combination, a cradle means upon which the leading wheels of a vehicle are adapted to be supported, flexible means suspending said cradle means from a wheeled horizontally movable overhead trolley, said trolley being supported upon a pair of parallel rails each positioned upon a longitudinal supporting member, each of said longitudinal supporting members in turn being supported by spaced vertical members engaging the floor supporting surface of the building in which said structure is to be positioned, hydraulic means carried by and movable with said trolley for cooperative engagement with said flexible means for elevating said cradle means, said trolley comprising two pairs of spaced members adjustably positioned with reference to each other, one of each of said pairs of spaced members carrying spaced cooperative gripping pieces having means for gripping the other of each pair of members therebetween and each member of each pair of spaced members being provided with cooperating apertures through which securing means are adapted to be positioned.

References Cited in the file of this patent

UNITED STATES PATENTS

| | | |
|---|---|---|
| 457,441 | Naylor | Aug. 11, 1891 |
| 1,354,038 | George et al. | Sept. 28, 1920 |
| 1,434,030 | Stone | Oct. 31, 1922 |
| 1,438,248 | Lehrack | Dec. 12, 1922 |
| 1,507,008 | Stone | Sept. 2, 1924 |
| 1,774,182 | McMillin | Aug. 26, 1930 |
| 1,866,801 | Ferris | July 12, 1932 |
| 2,060,027 | Butterworth | Nov. 10, 1936 |
| 2,077,376 | Cooper | Apr. 20, 1937 |
| 2,126,796 | McMillin | Aug. 16, 1938 |
| 2,620,225 | Hutchinson | Dec. 2, 1952 |
| 2,642,198 | German | June 16, 1953 |